US008179012B2

(12) United States Patent
Schoenherr et al.

(10) Patent No.: US 8,179,012 B2
(45) Date of Patent: May 15, 2012

(54) ELECTRO-MECHANICAL TRANSDUCER OF SMALL DIMENSIONS, IN PARTICULAR A TIMEPIECE GENERATOR

(75) Inventors: Uwe Schoenherr, Zuchwil (CH); Joerg Berthoud, Villeret (CH)

(73) Assignee: ETA SA Manufacture Horlogére Suisse, Grenchen (CH)

( * ) Notice: Subject to any disclaimer, the term of this patent is extended or adjusted under 35 U.S.C. 154(b) by 150 days.

(21) Appl. No.: 12/816,737

(22) Filed: Jun. 16, 2010

(65) Prior Publication Data

US 2010/0314964 A1 Dec. 16, 2010

(30) Foreign Application Priority Data

Jun. 16, 2009 (EP) ..................................... 09162869

(51) Int. Cl.
*H02K 21/24* (2006.01)
*H02K 1/00* (2006.01)

(52) U.S. Cl. ......... 310/156.66; 310/156.69; 310/156.71; 310/263

(58) Field of Classification Search ............. 310/156.66, 310/156.69, 156.71, 263
See application file for complete search history.

(56) References Cited

U.S. PATENT DOCUMENTS

| 4,775,813 | A * | 10/1988 | Janson ........................... 310/257 |
| 7,479,724 | B2 * | 1/2009 | Chen et al. ............. 310/216.045 |
| 2002/0070627 | A1 * | 6/2002 | Ward et al. ..................... 310/254 |

FOREIGN PATENT DOCUMENTS

| DE | 18 11 389 | 7/1969 |
| EP | 239 820 | 10/1987 |
| EP | 679 968 | 11/1995 |
| EP | 1 366 391 | 12/2003 |

OTHER PUBLICATIONS

European Search Report issued in corresponding application No. EP 09 16 2869, completed Oct. 23, 2009.

* cited by examiner

*Primary Examiner* — Quyen Leung
*Assistant Examiner* — Leda Pham
(74) *Attorney, Agent, or Firm* — Griffin & Szipl, P.C.

(57) ABSTRACT

The electromechanical transducer (2) includes a rotor (4) and two coil (6, 8), the rotor being formed of first, second and third parts (10, 11, 12) made of magnetic material with respectively first, second and third superposed central zones (14, 15, 16), a first, axially polarized, bipolar magnet (18) being arranged between the first and second central zones and a second bipolar magnet (20) axially polarized in an opposite direction to that of the first magnet being arranged between the second and third central zones. The first and third parts each include N tongues, where N is a number greater than one (N>1), which extend radially from the central zone and the second part including 2N tongues, of which N first tongues are folded such that their respective end zones are arranged in a first geometrical plane (26) in which the tongues of said first part are located, and of which N second tongues are folded such that their respective end zones are arranged approximately in a second geometrical plane (28) in which the tongues of said third part are located. The N first tongues of the second part are located respectively opposite the N tongues of the third part whereas the N second tongues of said second part are located opposite the N tongues of the first part. The two coils are located between the first and second geometrical planes of the rotor such that, when the rotor is rotating, the end zones of the rotor tongues pass opposite said at least one coil.

4 Claims, 2 Drawing Sheets

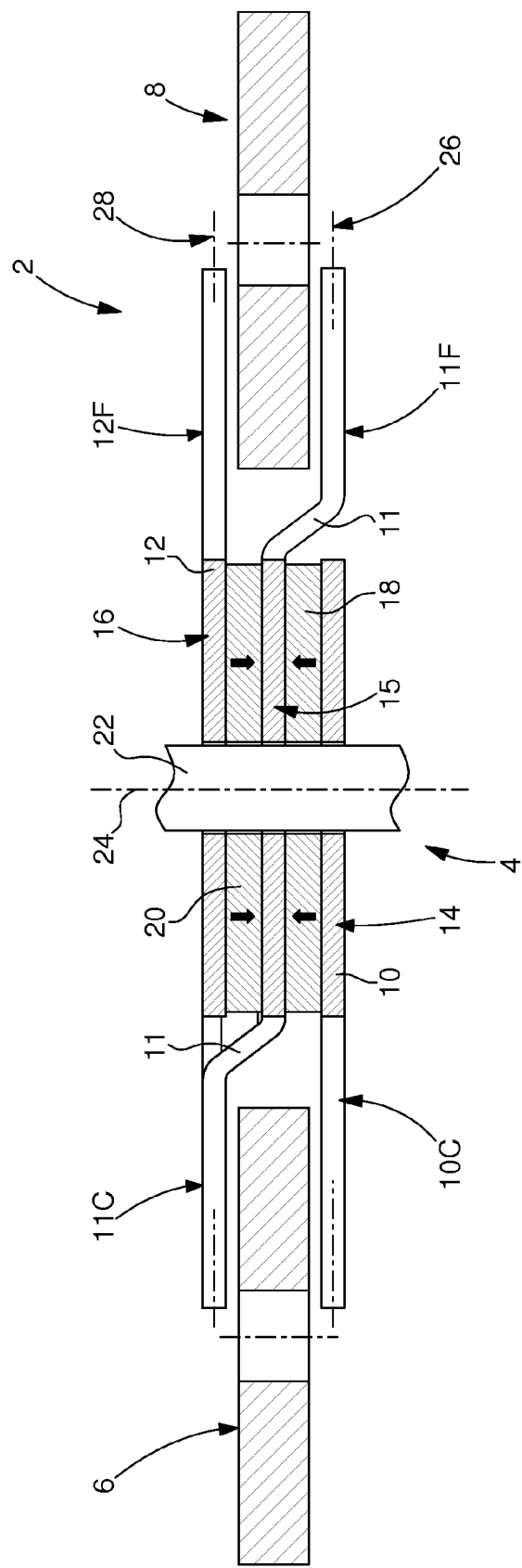

ELECTRO-MECHANICAL TRANSDUCER OF SMALL DIMENSIONS, IN PARTICULAR A TIMEPIECE GENERATOR

This application claims priority from European Patent Application No. 09162869.3 filed Jun. 16, 2009, the entire disclosure of which is incorporated herein by reference.

FIELD OF THE INVENTION

The present invention concerns an electro-mechanical transducer formed of a rotor with a plurality of magnetic poles and at least one flat coil (relatively low in height) that is arranged such that the magnetic poles of the rotor pass opposite said at least one coil when the rotor is rotating.

In particular, the electro-mechanical transducer defines a timepiece generator, i.e. a generator of small dimensions or a magneto-electric micro generator.

The timepiece generator according to the invention is for incorporation into a timepiece movement of the type disclosed in particular in EP Patent Nos. 239 820 or 679 968.

BACKGROUND OF THE INVENTION

A generator with a multi-polar rotor of the aforementioned type is disclosed in German Utility Model No. DE 1811389 (U). This generator includes a rotor, formed by a central arbour that carries two flanges made of magnetic material, at the periphery of which permanent magnets with alternating polarity are arranged, six per flange. The rotor thus includes twelve very small magnets, which are independently secured to one of the two magnetic rotor flanges. The generator also includes two or three flat coils arranged with an angular shift of 120° relative to the axis of rotation of the generator. When the rotor is rotating, the permanent magnets pass opposite the coils. In the embodiment shown, the central axis of the magnets passes approximately through the central axis of the coils. While rotating, the rotor thus induces an electric current in the coils, which is used to power an electronic circuit of a timepiece movement. This electric energy can be stored in a rechargeable battery or in a storage capacitor.

The generator disclosed in DE Utility Model No. 1811389 (U) can certainly efficiently produce an electric current for powering an electronic timepiece circuit and control a generator of this type such that it rotates at a constant speed synchronously with a time base that it powers. However, this generator has various major drawbacks. First of all, it is relatively complex and onerous to manufacture. Indeed, twelve very small magnets have to be supplied and then individually secured in a uniform manner to the periphery of the two magnetic rotor flanges. Next, this generator has a relatively large inertia with the two disc-shaped flanges each carrying six magnets at their periphery. The higher the level of inertia, the more sensitive the generator is to shocks (which means it has to rotate at a certain speed to prevent a shock from stopping it). It will also be noted that the starting torque is also relatively high as is the minimum torque necessary for the generator to operate synchronously.

SUMMARY OF THE INVENTION

It is an object of the present invention to provide an electro-mechanical transducer, in particular for horological type functions, which provides a solution to the aforementioned problems of the prior art, while maintaining a high level of operating efficiency.

The above object is solved according to the present invention by the characteristics of an electro-mechanical transducer, characterized in that the electro-mechanical transducer is formed of a rotor and at least one coil, wherein the rotor is formed of first, second and third parts made of magnetic material with respectively first, second and third superposed central zones, a first, axially polarised, bipolar magnet being arranged between the first and second central zones and a second bipolar magnet axially polarised in an opposite direction to that of the first magnet being arranged between the second and third central zones, the first and third parts each including N tongues, where N is a number greater than one, which extend radially and regularly from the central zone and the second part including 2N tongues, of which N first tongues are folded such that their respective end zones are arranged approximately in a first geometrical plane in which the tongues of said first part are located, and of which N second tongues are folded such that their respective end zones are arranged approximately in a second geometrical plane in which the tongues of said third part are located, the N first tongues of the second part being located respectively opposite the N tongues of the third part and the N second tongues of said second part being located opposite the N tongues of the first part, said at least one coil being located between the first and second geometrical planes of the rotor such that, when the rotor is rotating, the end zones of the rotor tongues pass opposite said at least one coil. Additionally, particularly beneficial, embodiments of the present invention are provided in accordance with the following subsidiary electro-mechanical transducers.

In accordance with a second electro-mechanical transducer embodiment of the present invention, the first embodiment is modified so that the first and third parts of the rotor are flat and cut in an identical manner. In accordance with a third electro-mechanical transducer embodiment of the present invention, the first embodiment is modified so that the number N of tongues of the first and third parts is equal to three and the number 2N of tongues of the second part is equal to six. In accordance with a fourth electro-mechanical transducer embodiment of the present invention, the third embodiment is modified so that the electro-mechanical transducer includes two coils angularly shifted by 120°.

As a result of the features of the transducer according to the invention, however many magnetic poles the rotor has, the number of permanent magnets necessary is greatly reduced. Indeed, the rotor has only two permanent magnets regardless of the number of magnetic poles of the rotor. The flux from the magnets is distributed in the tongues and closed in by the end regions of the top and bottom tongues arranged facing each other. All of the parts of the rotor can be manufactured at lower cost and the assembly of such parts is relatively easy. Consequently, the three magnetic flanges and the two bipolar magnets of the rotor are simply stacked on top of each other. The generator rotor can thus be produced at a reduced cost. Then, because the two bipolar magnets of relatively large dimensions are arranged coaxially to the axis of rotation of the rotor, most of the mass of the rotor is concentrated in the central zone thereof. Thus, the inertia of the generator rotor according to the present invention is less than that of the prior art rotor described above. The starting torque of this generator is lower and the generator is less sensitive to shocks. Moreover, the generator can rotate synchronously with a torque supplied by a barrel of the timepiece movement that is less than the minimum torque necessary for the prior art generator.

Consequently, for a given barrel, without any intermediate winding, the timepiece movement operates synchronously for an increased duration with the generator of the present invention.

BRIEF DESCRIPTION OF THE DRAWINGS

A preferred embodiment will be described in detail below with reference to the following description, made with reference to the annexed drawings, given by way of non-limiting example, in which:

FIG. 3 is a schematic cross-section along the line III-III of FIG. 2.

DETAILED DESCRIPTION OF THE PREFERRED EMBODIMENTS

Figure 1:
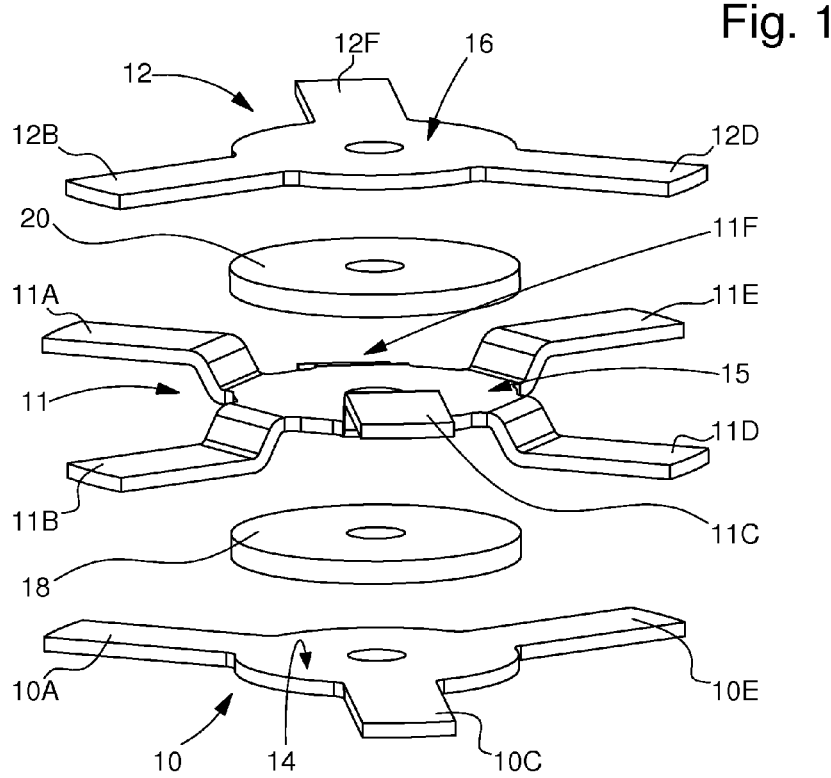
FIG. 1 is an exploded perspective view of the transducer rotor according to a preferred embodiment of the present invention.
Figure 2:
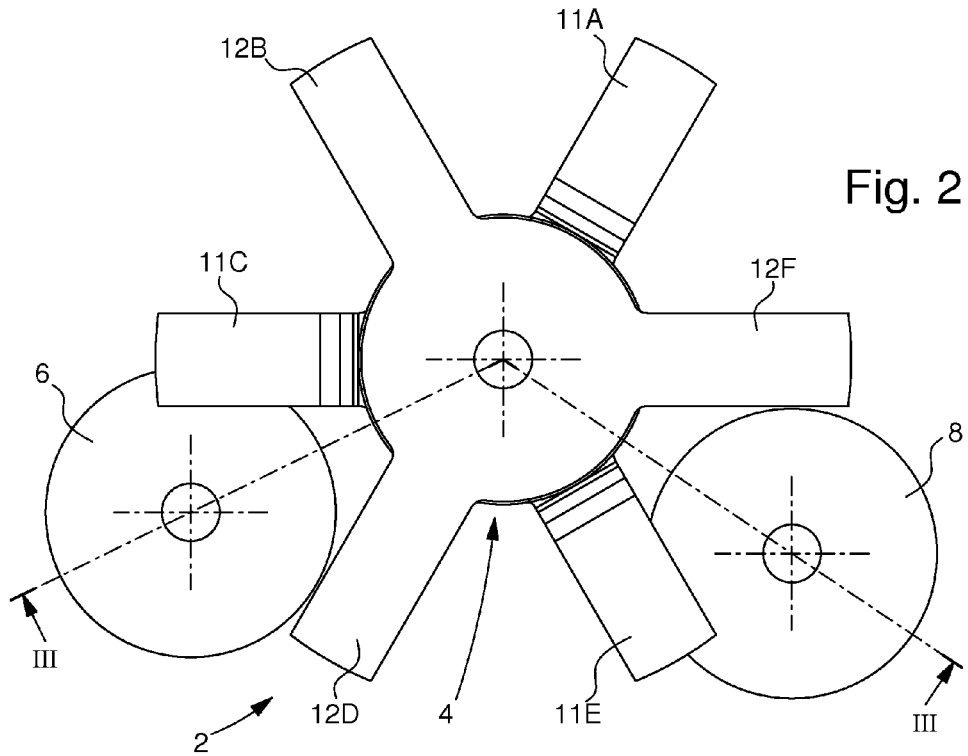
FIG. 2 is a top view of the transducer according to said preferred embodiment.

With reference to FIGS. 1 to 3, we will describe below a preferred embodiment of a timepiece type electromechanical transducer according to the invention. In particular, this transducer forms a magneto-electric generator 2. This generator 2 includes a rotor 4 and two flat coils 6 and 8. It will be noticed immediately that in a first variant, only one coil 6 is provided, whereas in a second variant, there are three coils, angularly shifted by 120°. Coils 6 and 8 have an angular shift of 120° relative to the axis of rotation 20 of rotor 4.

Rotor 4 is formed of first, second and third parts 10, 11 and 12 made of magnetic material. The first magnetic part 10 is formed by a flat structure defining a first central zone 14 and three tongues 10A, 10C and 10E, which extend radially from central zone 4. The three tongues are arranged in a uniform manner with an angular shift of approximately 120°. The magnetic part 10 thus defines a bottom plate cut so that it has a circular central zone and three tongues extending radially from said central zone. The third magnetic part 12 is identical to magnetic part 10. Thus, magnetic part 12 includes a central zone 16 of circular shape and three tongues 12B, 12D and 12F extending radially from the central zone. Magnetic part 12 defines a top plate cut so that it defines a central zone and three tongues, which are uniformly distributed around said central zone.

In projection into a geometrical plane perpendicular to axis of rotation 24, the tongues of bottom part 10 have an angular shift of 60° relative to the tongues of top part 12. Thus, in projection into said geometrical plane, the tongues of the top and bottom parts define six uniformly distributed radial directions, i.e. with an approximately constant angular shift between them. The second magnetic part 11 defines an intermediate part between the top and bottom parts. This intermediate part has a central zone 15 from which six tongues start. This intermediate part is distinct in that half of the tongues 11B, 11D and 11F, shifted at an angle of 120° relative to each other, are folded down such that their respective end zones are arranged approximately in a first geometrical plane 26 in which the flat plate 10, and in particular the tongues thereof, is located. Tongues 11B, 11D and 11F of part 11 are located between tongues 10A, 10C and 10E of bottom art 10 so as to define six magnetic poles with alternate polarity and regularly distributed around axis 24 in bottom plane 26. Intermediate part 11 also has three tongues 11A, 11C and 11E, shifted by 120° relative to each other, which are folded upwards such that their respective end zones are arranged approximately in a second geometrical plane 28 in which part 12 is located and in particular the tongues thereof. Tongues 11A, 11C and 11E of intermediate part 11 are located between tongues 12B, 12D and 12F of top part 12 so as to define six magnetic poles with alternate polarity, regularly distributed around axis 24 in top plane 28. The bottom three tongues 11B, 11D and 11F of the intermediate part are located respectively facing the three tongues 12B, 12D and 12F of top part 12. Likewise, the top three tongues 11A, 11C and 11E of the intermediate part are respectively located facing the three tongues 10A, 10C and 10E of bottom part 10.

A first, axially polarised, bipolar magnet 18 is arranged between the first and second central zones 14 and 15. A second bipolar magnet 20, polarised in an opposite direction to that of the first magnet, is arranged between central zones 15 and 16. Thus, the pairs of tongues located opposite each other have opposite magnetic polarities and define the magnetic poles of the rotor. Likewise, two adjacent tongues in geometric plane 26 or 28 have opposite magnetic polarities. The two coils 6 and 8 are arranged between the first and second planes 26 and 28 such that, when rotor 4 is rotating, the end zones of the rotor tongues pass opposite the two coils.

It will also be noted that the three respective central zones of the three magnetic parts of the rotor are superposed on each other and that the two magnets 18 and 20 are coaxial to these central zones. The rotor can be assembled easily by simply stacking the five elements shown in FIG. 1 and described in detail above. These five elements are mounted on a central arbour 22.

The preferred embodiment described above includes top and bottom parts that each has three tongues whereas the intermediate part has six tongues. According to other embodiments and in general, the number of tongues of the top and bottom parts is equal to N, with N being great than 1 (N>1). These N tongues are distributed uniformly around a central zone and extend radially from this central zone as in the preferred embodiment shown in the Figures. The intermediate part then includes 2N tongues, of which N first tongues are folded down such that their respective end zones are arranged approximately in a first, bottom plane in which the tongues of the bottom part are located. The N other remaining tongues are folded upwards such that their respective end zones are arranged approximately in a second, top plane in which the tongues of the top part are located. The rotor then has 2N pairs of poles, each pair of poles being defined respectively by two tongue ends located opposite each other.

What is claimed is:

1. An electromechanical transducer formed of a rotor and at least one coil, wherein the rotor is formed of first, second and third parts made of magnetic material with respectively first, second and third superposed central zones, a first, axially polarised, bipolar magnet being arranged between the first and second central zones and a second bipolar magnet axially polarised in an opposite direction to that of the first magnet being arranged between the second and third central zones, the first and third parts each including N tongues, where N is a number greater than one, which extend radially and regularly from the central zone and the second part including 2N tongues, of which N first tongues are folded such that their respective end zones are arranged approximately in a first geometrical plane in which the tongues of said first part are located, and of which N second tongues are folded such that their respective end zones are arranged approximately in a second geometrical plane in which the tongues of said third part are located, the N first tongues of the second part being located respectively opposite the N tongues of the third part and the N second tongues of said second part being located opposite the N tongues of the first part, said at least one coil being located between the first and second geometrical planes of the rotor such that, when the rotor is rotating, the end zones of the rotor tongues pass opposite said at least one coil.

2. The electromechanical transducer according to claim 1, wherein the first and third parts of the rotor are flat and cut in an identical manner.

3. The electromechanical transducer according to claim 1, wherein the number N of tongues of the first and third parts is equal to three and the number 2N of tongues of the second part is equal to six.

4. The electromechanical transducer according to claim 3, wherein it includes two coils angularly shifted by 120°.

\* \* \* \* \*